United States Patent
Oguma

(10) Patent No.: US 9,460,372 B2
(45) Date of Patent: Oct. 4, 2016

(54) IMAGE FORMING APPARATUS AND IMAGE FORMING SYSTEM THAT ACQUIRE AND OUTPUT PRINT JOB WITHOUT USING SPOOLER FUNCTION

(71) Applicant: KYOCERA Document Solutions Inc., Osaka (JP)

(72) Inventor: Takashi Oguma, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/799,557

(22) Filed: Jul. 14, 2015

(65) Prior Publication Data

US 2016/0012321 A1    Jan. 14, 2016

(30) Foreign Application Priority Data

Jul. 14, 2014    (JP) .................................. 2014-144058

(51) Int. Cl.
*G06K 15/02* (2006.01)
*G06F 3/12* (2006.01)

(52) U.S. Cl.
CPC ........... *G06K 15/1821* (2013.01); *G06F 3/121* (2013.01); *G06F 3/1234* (2013.01); *G06F 3/1285* (2013.01); *G06F 3/1236* (2013.01); *G06K 15/1817* (2013.01)

(58) Field of Classification Search
CPC .................................................. G06K 15/1806
USPC ................................................ 358/1.15, 1.14
See application file for complete search history.

(56) References Cited

U.S. PATENT DOCUMENTS

| | | | | |
|---|---|---|---|---|
| 2001/0022912 A1* | 9/2001 | Miyasaka | ............. | G06F 3/1204 400/61 |
| 2004/0004739 A1* | 1/2004 | Koike | .................... | G06F 3/1204 358/1.16 |
| 2009/0303536 A1* | 12/2009 | Koga | ................. | H04N 1/32496 358/1.15 |

FOREIGN PATENT DOCUMENTS

JP          2007-179496 A       7/2007

* cited by examiner

*Primary Examiner* — Andrew H Lam
(74) *Attorney, Agent, or Firm* — Hawaii Patent Services; Nathaniel K. Fedde; Kenton N. Fedde

(57) ABSTRACT

Provided is an image forming apparatus that performs printout processing smoothly, even if printout from apparatus having no spooler, such as a tablet or a smart phone. The image forming apparatus includes the port for printing and an application executing part. The port for printing acquires a print job transmitted from an external apparatus without using spooler function. The application executing part works on a specified platform. The application executing part receives the print job from the external apparatus via a network. Then, the application executing part confirms whether or not the print buffer has space to the port for printing. When the print buffer cannot be used, an application executing part notifies the external apparatus for stopping the transmission of the print job until it becomes available.

7 Claims, 5 Drawing Sheets

1: IMAGE FORMING SYSTEM

IMAGE FORMING APPARATUS AND IMAGE FORMING SYSTEM THAT ACQUIRE AND OUTPUT PRINT JOB WITHOUT USING SPOOLER FUNCTION

INCORPORATION BY REFERENCE

This application is based on and claims the benefit of priority from Japanese Patent Application No. 2014-144058 filed on Jul. 14, 2014, the contents of which are hereby incorporated by reference.

BACKGROUND

The present disclosure relates to an image forming apparatus and an image forming system, and for example, it is related with an image forming apparatus and image forming system that acquire a print job (print data) transmitted from an external apparatus without using spooler function and execute an output process.

A typical OS (Operating System) in an external terminal, such as a personal computer, has spooler function (hereinafter, it is just called as a "spooler"). By the spooler, OS controls printing in image forming apparatuses, such as a printer and an MFP (Multi Functional Peripheral.) The spooler checks the function of the image forming apparatus by using a technology, such as SNMP (Simple Network Management Protocol.) Thereby, transmission of printing data is controlled.

As a typical case, in order to make a printing process in harmony, buffer having suitable size is needed. Then, processing speed is stably raised by effectively-controlling input/output to the buffer, which is usually FIFO type.

SUMMARY

An image forming apparatus of the present disclosure includes a port for printing and an application executing part. The port for printing acquires a print job transmitted from an external apparatus without using spooler function. The application executing part works on a specific platform. The application executing part receives the print job from the external apparatus via a network. Then, the application executing part confirms whether or not a print buffer has space for the port for printing. When the print buffer cannot be used, the application executing part notifies the external apparatus for stopping transmission of the print job until it becomes available. An image forming apparatus of the present disclosure acquires and executes a print job transmitted from an external apparatus without using spooler function. The image forming apparatus includes an application executing part and a working memory area. The application executing part works on a specific platform. The working memory area is set up available to the application executing part. The application executing part receives the print job from the external apparatus via a network. Then, an application executing part confirms whether or not a print buffer has space for the port for printing. The application executing part determines whether or not the print buffer can be used. When the print buffer cannot be used, the application executing part temporarily stores the print job acquired from the external apparatus to the working memory area until it becomes available. An image forming system of the present disclosure has an external apparatus and an image forming apparatus. The external apparatus does not have spooler function. The image forming apparatus acquires and executes the print job transmitted from the external apparatus. The image forming apparatus includes an application executing part. The application executing part works on a specific platform. The application executing part receives the print job from the external apparatus via a network. Then, an application executing part confirms whether or not a print buffer has space for the port for printing. When the print buffer cannot be used, an application executing part notifies the external apparatus for stopping transmission of the print job until it becomes available.

DETAILED DESCRIPTION

Hereinafter, a form for carrying out the present disclosure (henceforth an "embodiment") is explained with reference to drawings.

Figure 1:
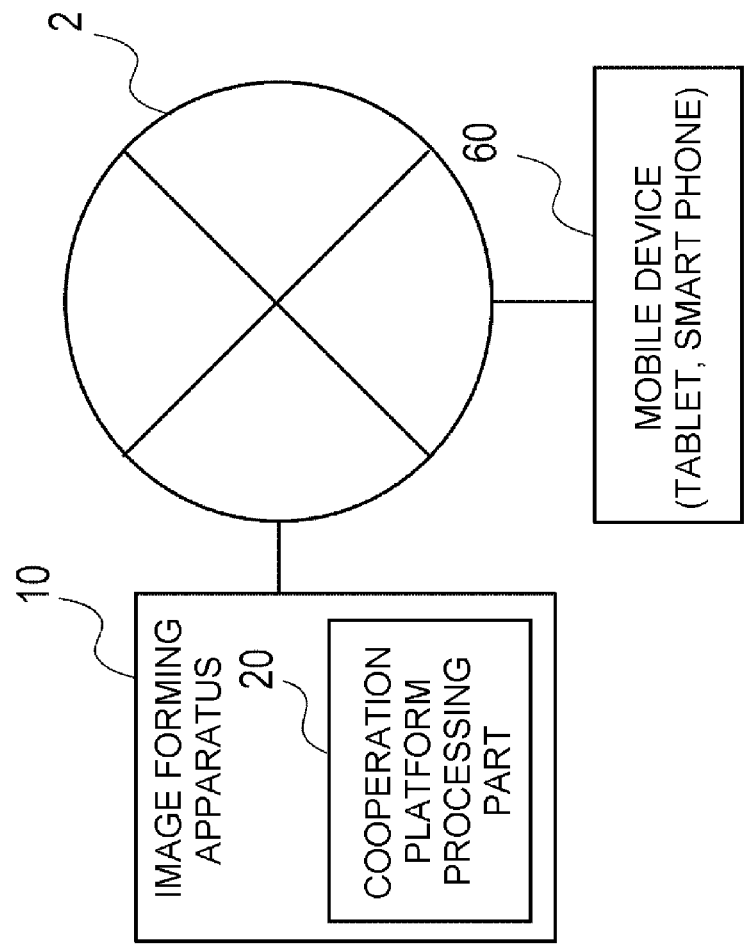
FIG. 1 is a diagram illustrating an outline configuration of an image forming system related to an embodiment.

FIG. 1 is a functional block diagram illustrating a schematic structure of image forming system 1 related to the present embodiment. As like the illustration, image forming system 1 includes image forming apparatus 10 and mobile device 60, which are mutually connected via network 2.

Mobile device 60 is a terminal. Mobile device 60 perform a printout to image forming apparatus 10 via network 2. OS in mobile device 60 does not have a spooler about the printout. In such a configuration, as mentioned above, when the printer buffer of image forming apparatus 10 becomes full, the process stops. In this case, it becomes an error depending on the situation. Accordingly, in the present embodiment, even if it is apparatus that does not have a spooler, such as the OS in mobile device 60, a technology that a printing process can be performed properly is shown. In the following, it explains paying attention to a direct printing process.

Image forming apparatus 10 has cooperation platform processing part 20 that realizes system extensibility. Image forming apparatus 10 can cooperate with various apparatus as centered on mobile device 60 or the other network.

Figure 2:
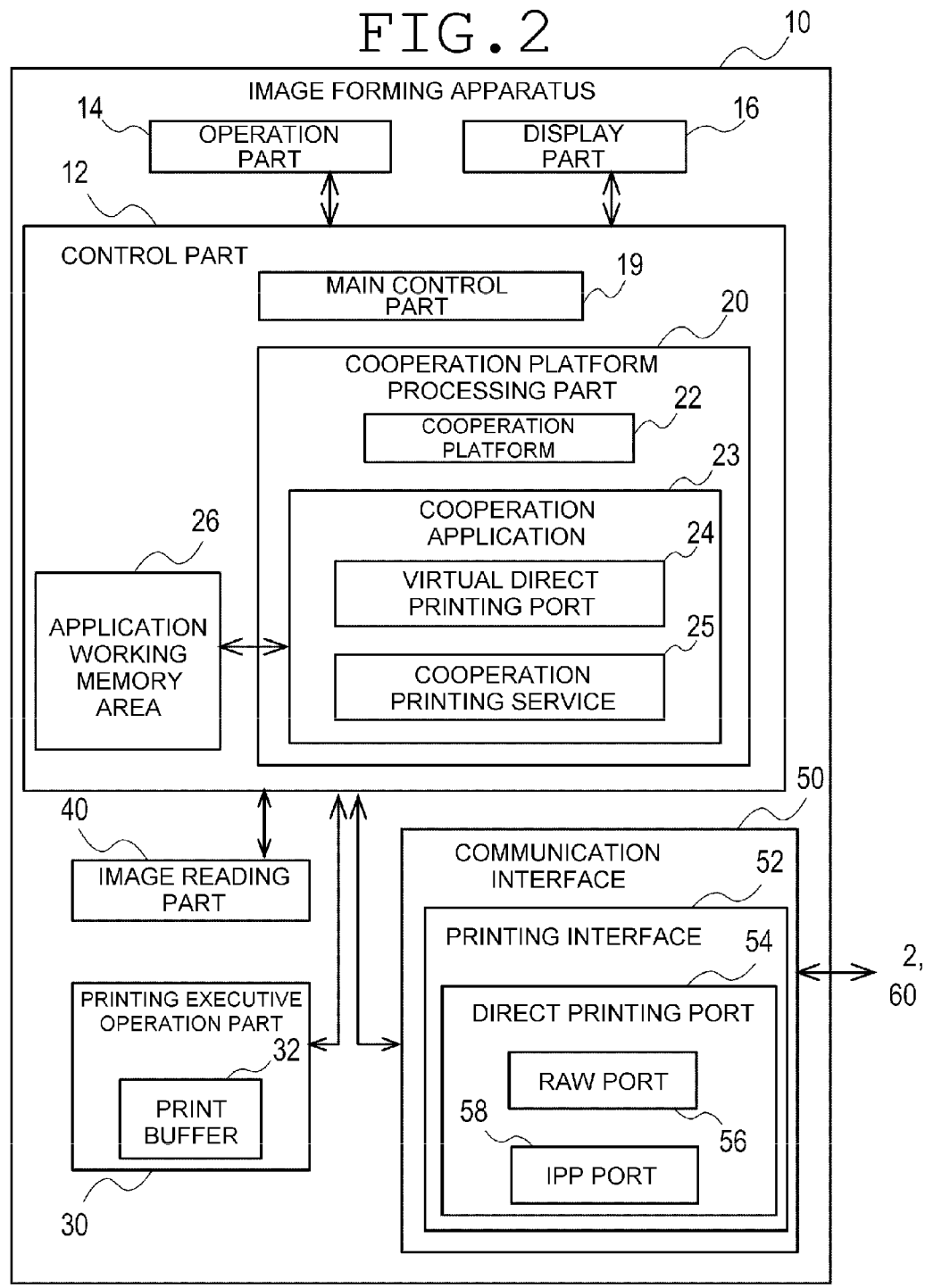
FIG. 2 is a functional block diagram of the image forming apparatus related to the embodiment.

FIG. 2 is a functional block diagram showing a schematic structure of image forming apparatus 10. FIG. 2 is mainly shown paying attention to the direct printing process. About the configuration for the other process, illustration and explanation are omitted suitably.

Image forming apparatus 10 is an MFP, for example. Image forming apparatus 10 includes control part 12, operation part 14, display part 16, printing executive operation part 30, image reading part 40, and communication interface 50.

Operation part 14 is a user interface including specific feature buttons, such as an execution key, numeric keypads, or the like. Display part 16 is configured to have a liquid crystal panel, or the like, and displays an operating state, or the like. In addition, a touch key, or the like, which operation part 14 and display part 16 are combined into one as a configuration may be used.

Printing executive operation part 30 has general printing executed functions and executes print operation by instructions from control part 12. Also, printing executive operation part 30 has print buffer 32. The print buffer 32 is a high-speed storage part, such as a FIFO type, which temporarily stores print data sent from mobile device 60 to image forming apparatus 10.

Image reading part 40 is a general configuration that is possible to read a manuscript in A3 size or A4 size, for example. Image reading part 40 includes a scanner, platen glass, a manuscript reading slit, a manuscript sheet feeding device, or the like.

Control part 12 is an information processing part including a non-transitory recording medium. Control part 12 performs various kinds of processes. Here, control part 12 has main control part 19 as a function to perform totally processing in image forming apparatus 10. Also, control part 12 has cooperation platform processing part 20 and application working memory area 26 as a distinctive configuration in the present embodiment.

Cooperation platform processing part 20 includes cooperation platform 22 and cooperation application 23.

Cooperation platform 22 is a solution platform based on Internet standard technologies, such as a web browser and a web service.

Cooperation application 23 is an application executing part that executes application, which works on cooperation platform 22. Cooperation application 23 enables network cooperation with mobile device 60 and other apparatus by using function of image forming apparatus 10.

Cooperation platform processing part 20 receives a printing process from mobile device 60 by using cooperation application 23. In detail, a printing process is received by using virtual direct printing port 24. In this case, cooperation platform processing part 20 realizes so-called direct printing. In order to realize the direct printing, cooperation application 23 is acting as a host of the virtual direct printing port (henceforth "virtual direct printing port 24").

In detail, virtual direct printing port 24 receives a job from an application for OS in mobile device 60 by using the web service. OS in the mobile device 60 is a type of OS without having spooler function, as mentioned above. Also, cooperation application 23 has cooperation printing service 25. This is for supporting the printing process in cooperation application 23.

When the print data which specified the virtual direct printing port 24 are received, cooperation printing service 25 substitutes and executes for the spooler of OS in mobile device 60. Cooperation printing service 25 transmits the print data to actual direct printing port 54.

Application working memory area 26 is a memory area used as work space and a specific storing area when a process of cooperation application 23 is executed. Application working memory area 26 may be set for exclusive use. Also, application working memory area 26 may be shared with other purpose and functions.

Communication interface 50 is an interface for communicating with an external apparatus. Communication interface 50 includes a LAN interface, the USB interface for local connection, or the like. Here, it explains assuming the LAN interface.

Communication interface 50 includes printing interface 52 that receives data about printing from mobile device 60, or the like. The data about printing is print data, printing instructions, or the like. Printing interface 52 has direct printing port 54. Direct printing port 54 includes RAW port 56 and IPP (Internet Printing Protocol) port 58.

Generally, when direct printing, print data are directly transmitted from mobile device 60 to direct print port 54 in image forming apparatus 10. In this case, the RIP (Routing Information Protocol) component included in image forming apparatus 10 analyzes the certification information included in printable data (print data). Then, a RIP component authenticates if needed.

According to the present embodiment, the printing process, or the like, by using cooperation application 23 in cooperation platform processing part 20 are performed. In this case, cooperation application 23 bears the duty of the authentication about access from mobile device 60 to image forming apparatus 10. Here, virtual direct printing port 24 acquires the data of direct printing. Then, cooperation application 23 authenticates by analyzing certification information. Then, cooperation application 23 transmits the data of direct printing to direct printing port 54, internally.

Figure 3:
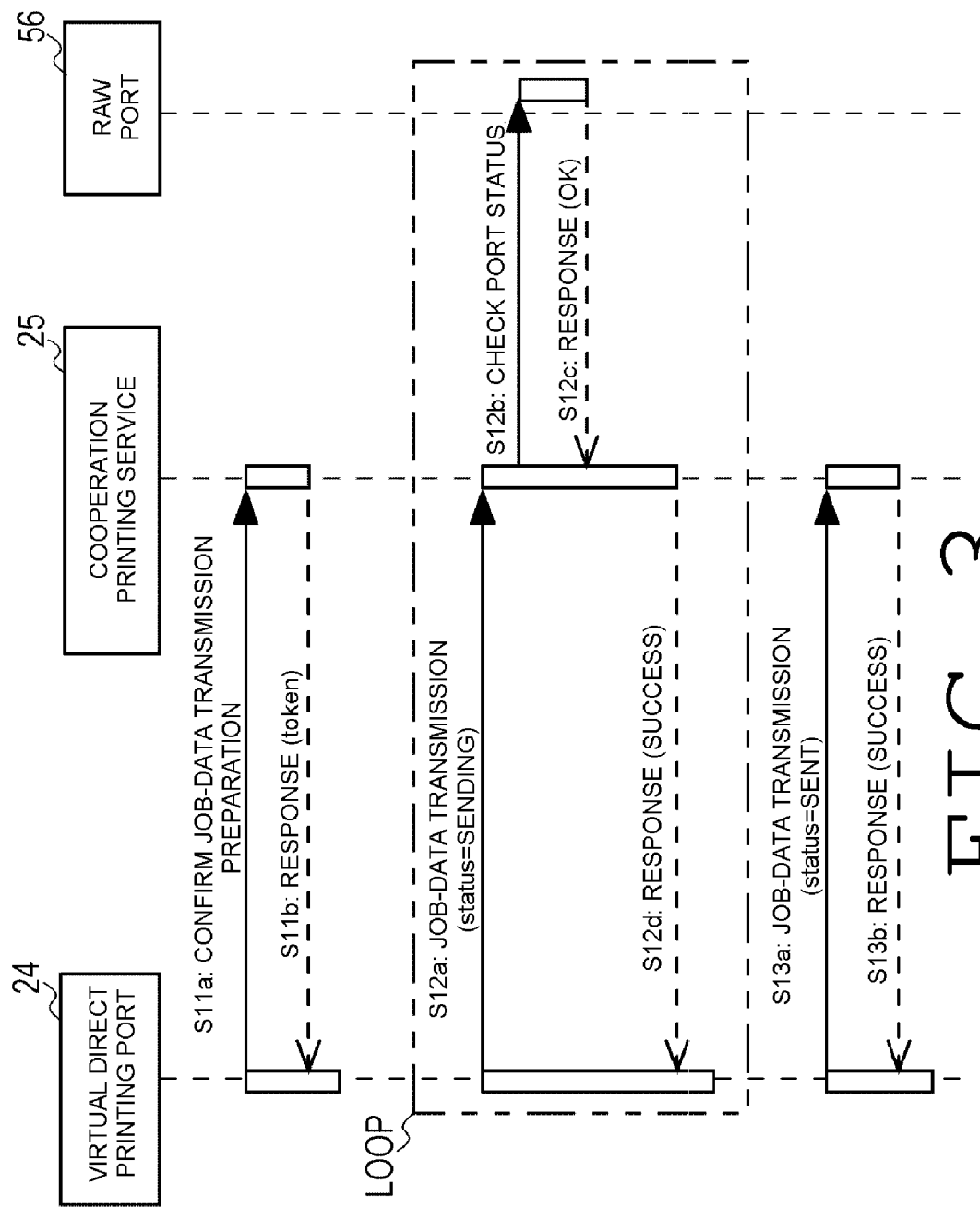
FIG. 3 is a chart figure illustrating the process in case of performing direct printing from a mobile device related to an embodiment.

FIG. 3 is a chart figure illustrating the process in case of performing direct printing from mobile device 60. In FIG. 3, a process in the case that print buffer 32 is not full and thus being processed in harmony is shown.

Mobile device 60, which is a client, transmits divided print data in multiple times to cooperation application 23. In this case, mobile device 60 divides print data into a chunk of specific amount of data and transmits. In detail, Mobile device 60 transmits them to the web service, which cooperation application 23 provides.

Cooperation application 23 receives data and confirms whether or not direct printing is possible. That is, cooperation application 23 confirms whether or not it can transmit to direct printing port 54 (here RAW port 56.) Then, when print buffer 32 has space and thus has no trouble in the printing process, cooperation application 23 transmits data to direct printing port 54 as it is.

In detail, virtual direct printing port 24 acquires print data from mobile device 60. Then, virtual direct printing port performs job-data transmission preparation confirming process to cooperation printing service 25 (S11*a*.) That is, it is confirmed whether or not print data can be transmitted. When ready, cooperation printing service 25 answers printing authority (token) (S11*b*.)

Then, virtual direct printing port 24 executes job-data transmission process to cooperation printing service 25 (S12*a*.) At this time, it is in the state where print data are transmitted, properly. Therefore, it becomes "status=SENDING."

Continuing, cooperation printing service 25 transmits print data to RAW port 56. Also, cooperation printing service 25 checks port status of RAW port 56 (S12*b*). RAW port 56 replies the response (OK) that means properly receiving (S12*c*.) Cooperation printing service 25, which receives the reply, notifies to virtual direct printing port 24 that the reply of the transmission is succeeded (S12*d*.) This process is performed loop processing until completing all the data divided into the chunk.

When the transmission of print data is completed, virtual direct printing port 24 notifies that effect to cooperation printing service 25 (S13*a*.) That is, for example, the job data of "status=SENT" are transmitted. Printing service 25 for cooperation notifies the response that is succeeded to virtual direct printing port 24 (S13*b*.) Then, the direct printing process is completed.

Figure 4:
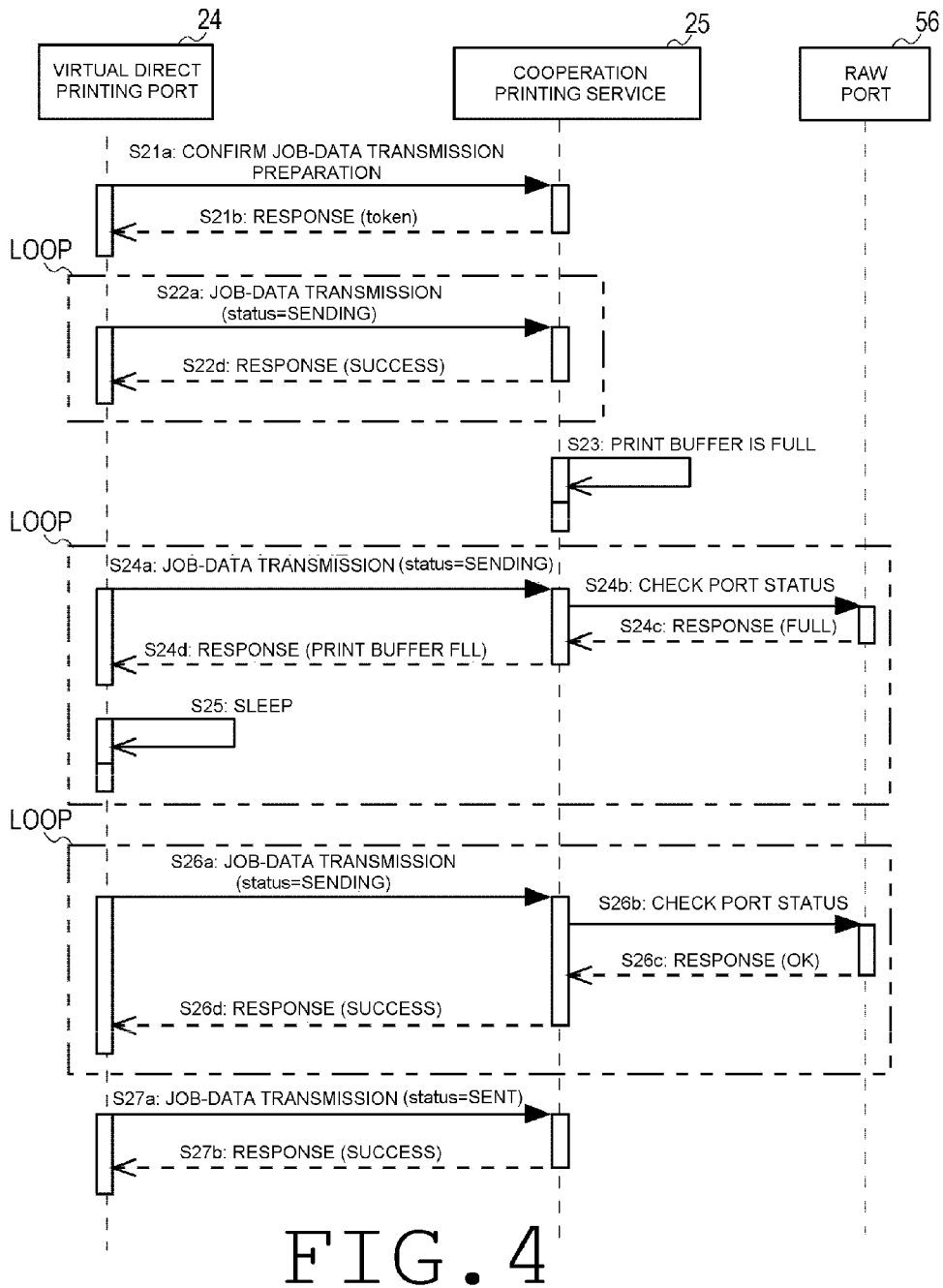
FIG. 4 is a chart figure illustrating the process in case of performing direct printing from the mobile device related to an embodiment.

FIG. 4 is a chart figure illustrating the process in case of performing direct printing from mobile device 60. FIG. 4 shows process in case that print buffer 32 is full.

Such a situation, it is estimated in case that large printing data are transmitted. That is, it is estimated the case where the RIP processing of the print data in image forming apparatus 10 has not fulfilled transmission speed. Also, it is estimated in case that a paper jam, or the like, occurs while printing a job and the job has stopped, or the like.

In this case, cooperation application 23 confirms the state of RAW port 56. Then, when print buffer 32 is full, cooperation application 23 reply that effect to mobile device 60. Mobile device 60 that is received it sleeps and tries transmission of data, again.

In detail, the following process is executed. That is, virtual direct printing port 24 acquires print data from mobile device 60. Then, virtual direct printing port 24 performs job-data transmission preparation confirmation process to cooperation printing service 25 (S21*a*.) When cooperation printing service 25 is ready, printing authority (token) is replied (S21*b*).

Then, virtual direct printing port 24 executes job-data transmission process to cooperation printing service 25 (S22*a*.) At this time, it is in the state where print data are transmitted, properly. Therefore, it becomes "status=SENDING."

When print data are received, cooperation printing service 25 reports that is succeeded (S22*b*). Loop processing of these processes are performed until all the data divided into the chunk is completed.

Here, cooperation printing service 25 confirms to RAW port 56. In this case, it is estimated that the situation where print buffer 32 is full and cannot be used is occurred and is reported (S23.)

When print buffer 32 changes into the state of full, virtual direct printing port 24 continues the process that transmits print data to cooperation printing service 25 (S24*a*.) At this time, it is in the state where print data are transmitted, properly. Therefore, it becomes "status=SENDING."

Cooperation printing service 25 checks port status to RAW port 56. That is, cooperation printing service 25 confirms whether or not print buffer 32 becomes empty or still full (S24*b*). Here, since it is in the state of full, that effect is notified from RAW port 56 to cooperation printing service 25 (S24*c*.)

Continuing, cooperation printing service 25 responses that print buffer 32 is full to virtual direct printing port 24 (S24*d*.) Virtual direct printing port 24 sleeps in a specific period (S25). Then, virtual direct printing port 24 returns to the process at S24*a* and loops until print buffer 32 is full. That is, virtual direct printing port 24 reports that print buffer 32 is full to mobile device 60. Thereby, virtual direct printing port 24 advices to sleep in the specific period. Mobile device 60 performs data transmission again after the specific sleep.

When print buffer 32 becomes empty, it shifts to the next process. That is, virtual direct printing port 24 continues the process that transmits print data to cooperation printing service 25 as like above-mentioned (S26*a*.) Cooperation printing service 25 checks port status in RAW port 56 (S26*b*.) Then, since print buffer 32 is empty, the response (OK) that can use is returned from RAW port 56 to cooperation printing service 25 (S26*c*.) When transmission of print data is performed, cooperation printing service 25 reports succeeding to virtual direct printing port 24 (S26*d*). Loop processing of these processes are performed until all the data divided into the chunk is completed.

When transmission of print data is completed, virtual direct printing port 24 notifies that effect to cooperation printing service 25 (S27*a*.) Cooperation printing service 25 notifies the response of succeeding to virtual direct printing port 24 (S27*b*.) Thereby, the direct printing process is completed.

Figure 5:
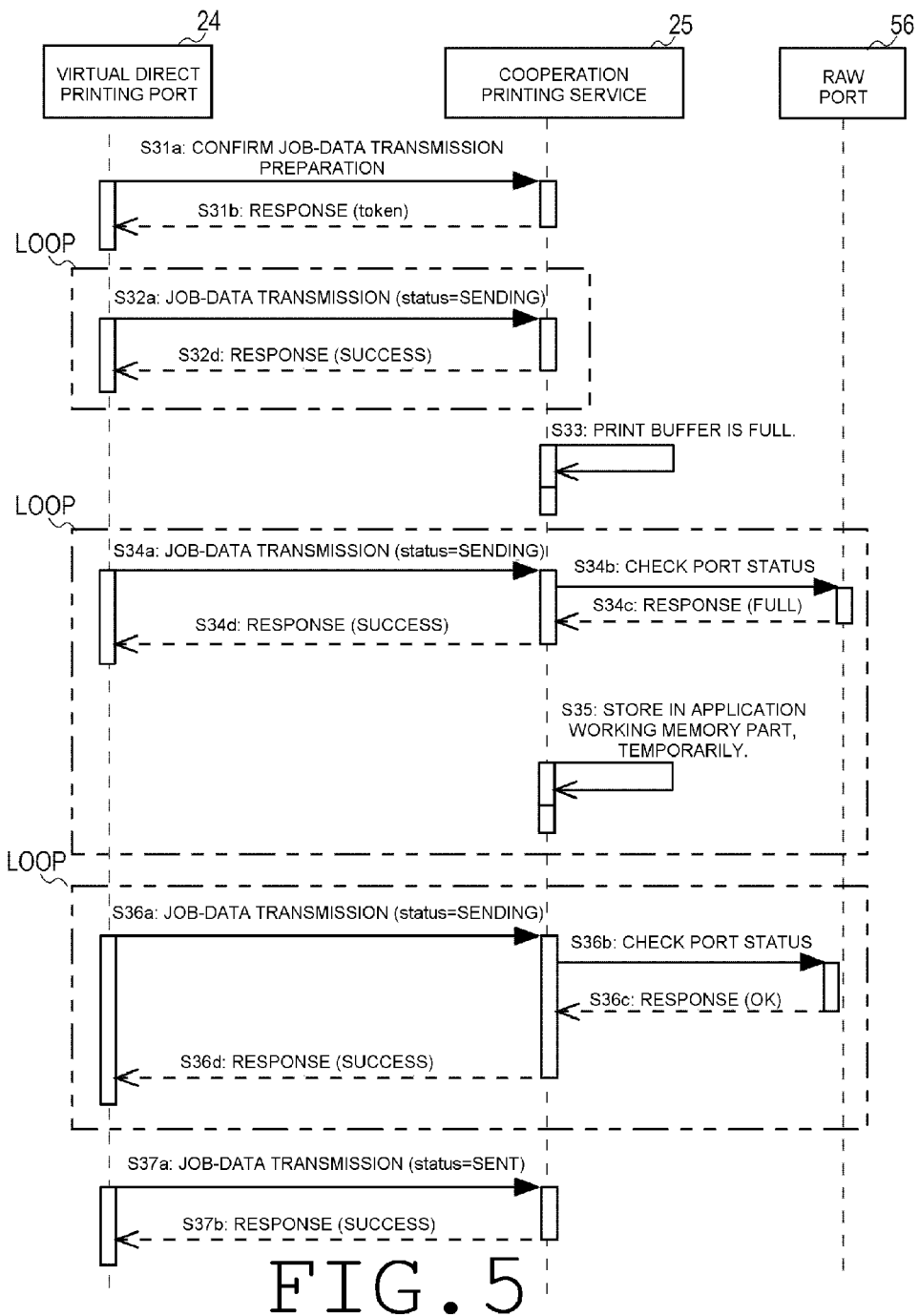
FIG. 5 is a chart figure illustrating the process in case of performing direct printing from the mobile device related to an embodiment.

FIG. 5 is a chart figure illustrating the process in case of performing direct printing from mobile device 60. FIG. 5 shows another process in case that print buffer 32 is full. In the process shown in FIG. 4, when print buffer 32 of image forming apparatus 10 becomes empty, print data are not processed, immediately. Therefore, it is necessary to transmit the buffer, again. Therefore, it may lead to reduction of performance.

Accordingly, in the process shown in FIG. 5, a process is executed that the buffer transmitted to application working memory area 26 is stored, temporarily. Application working memory area 26 can be used by cooperation application 23. The stored buffer is transmitted to RAW port 56 as soon as print buffer 32 has space. Therefore, it becomes possible to minimize reduction of performance.

In detail, the following processes are executed. That is, virtual direct printing port 24 acquires print data from mobile device 60. Then, virtual direct printing port 24 performs job-data transmission preparation confirming process to cooperation printing service 25 (S31*a*.) When ready, cooperation printing service 25 replies printing authority (token) (S31*b*.)

Then, virtual direct printing port 24 executes job-data transmission process to cooperation printing service 25 (S32*a*.) At this time, it is in the state where print data are transmitted, properly. Therefore, it becomes "status=SENDING."

When print data are received, cooperation printing service 25 reports that is succeeded (S32*b*.)

Here, it is estimated that the situation where print buffer 32 is full and cannot be used is occurred and is reported (S33).

When print buffer 32 changes into the state of full, virtual direct printing port 24 continues the process that transmits print data to cooperation printing service 25 (S34*a*.)

Cooperation printing service 25 checks port status in RAW port 56. That is, cooperation printing service 25 confirms whether print buffer 32 becomes empty or still full (S34*b*.) Since it is in the state of full, that effect is notified from RAW port 56 to cooperation printing service 25 (S34*c*.) Continuing, cooperation printing service 25 performs the response that print buffer 32 is full to virtual direct printing port 24 (S34*d*.) Then, cooperation printing service 25 temporarily stores the acquired print data to application working memory area 26 (S35.)

When print buffer 32 becomes empty, it shifts to the next process. That is, virtual direct printing port 24 continues the process that transmits the print data to cooperation printing service 25 as like above-mentioned (S36*a*.) Printing service 25 for cooperation checks the port status in RAW port 56 (S36*b*.) Then, since print buffer 32 is empty, the response (OK) that can use returns from RAW port 56 to cooperation printing service 25 (S36*c*.)

In this case, the print data of application working memory area 26 are firstly transmitted to RAW port 56. Then, the print data, which is sent from virtual direct printing port 24, are sent to RAW port 56. Next, cooperation printing service 25 reports that is succeeded to virtual direct printing port 24 (S36*d*.) Loop processing of these processes are performed until all the data divided into the chunk is completed.

When transmission of print data is completed, virtual direct printing port 24 notifies that effect to cooperation printing service 25 (S37*a*.) Printing service 25 for cooperation notifies the response of succeeding to virtual direct printing port 24 (S37*b*.) Then, the direct printing process is completed.

As mentioned above, according to the present embodiment, even if it is a case where a printing process is accomplished from mobile device 60 by OS which does not have a spooler which works, a printing process in harmony is realizable. Also, even if it is a case where print buffer 32 is full in image forming apparatus 10, a printing process in harmony is realizable. Especially, in case of a direct printing process, sufficient processing capacity for the interpretation of the print data in image forming apparatus 10 may be required. In the typical case, the capacity of the print buffer might be insufficient to the amount of data, and processing capacity might be lower, significantly. However, according to the present embodiment, drastic reduction of such processing capacity can be reduced.

When it explains in detail, as like of OS equipped in a tablet terminal (henceforth a "tablet"), a smart phone, or the like, there is an apparatus that does not provide the spooler. In that case, the problem is occurred that print control by the spooler cannot be performed. In case that print data are transmitted to a device (image forming apparatus) from an application that works on OS without a spooler, the print buffer of the device may be exhausted. In this case, it becomes impossible to transmit more print data. For example, when a job stops with a paper jam, or the like, a client (print data transmission-source) can transmit the job until the print buffer becomes full. However, just as it being full, it becomes impossible to transmit more data. As a result, overall printing speed is reduced. In recent years, as a tablet or smart phones is popular, the printout is performed more by them. Therefore, the technology of raising the efficiency of a printing process is required.

However, the typical case is not the technology supposing apparatus without the spooler, such as a tablet or a smart phone. Therefore, another technology is required. Naturally, in an image forming apparatus, although solution is possible by using a print buffer as large scale, it is not realistic by an aspect of cost.

As compared with this, according to the present disclosure, even if it is a case where a printout is performed from apparatus without the spooler, such as a tablet or a smart phone, to an image forming apparatus, printout process can be performed, smoothly.

In the above, the present disclosure is explained based on the embodiment. This embodiment is exemplification, and various modifications about the combination of each of those components are possible for it. Also, such a modification is also in the range of the present disclosure and is to be understood by the person skilled in the art.

What is claimed is:

1. An image forming apparatus comprising:
   a print buffer that temporarily stores a print job received from a mobile device to the image forming apparatus via a network;
   a direct printing port; and
   a cooperation application that includes a virtual direct printing port,
   wherein:
   the virtual direct printing port in the cooperation application receives the print job received from the mobile device without using a spooler using a Web service which the cooperation application provides; and
   the cooperation application
   i) works on a specified platform,
   ii) when the print job is received from the mobile device, confirms whether or not the print buffer is full,
   iii) if the print buffer is not full, transmits the print job to the direct printing port, and
   iv) if the print buffer is full, notifies to the mobile device that the print buffer is full and advices the mobile device to sleep for a specific period via the virtual direct printing port.

2. The image forming apparatus according to claim 1, wherein
   the specified platform is provided by using an internet standard technology in order to cooperate with the mobile device, and
   the cooperation application performs a cooperated process with the mobile device via the network.

3. The image forming apparatus according to claim 1, wherein the direct printing port includes a RAW port an IPP port.

4. An image forming apparatus comprising:
   a print buffer that temporarily stores a print job received from a mobile device to the image forming apparatus via a network;
   a direct printing port;
   a cooperation application that includes a virtual direct printing port; and
   an application working memory area that is available to the cooperation application,
   wherein:
   the virtual direct printing port in the cooperation application receives the print job received from the mobile device without using a spooler using a Web service which the cooperation application provides; and
   the cooperation application
   i) works on a specified platform,
   ii) when the print job is received from the mobile device, confirms whether or not the print buffer is full,
   iii) if the print buffer is not full, transmits the print job to the direct printing port, and
   iv) if the print buffer is full, temporarily-stores the print job received from the mobile device in the application working memory area until the print buffer is not full.

5. The image forming apparatus according to claim 4, wherein
   the specified platform is provided by using an internet standard technology in order to cooperate with the mobile device, and
   the cooperation application performs a cooperated process with the mobile device via the network.

6. An image forming system comprising:
   the image forming apparatus according to claim 4, and
   the mobile device, wherein the mobile device does not have a spooler function.

7. An image forming system comprising;
   a mobile device that does not have a spooler and
   an image forming apparatus that receives and performs a print job, wherein the print job is received from the mobile device;
   the image forming apparatus including:

a print buffer that temporarily stores the print job;
a direct printing port; and
a cooperation application that includes a virtual direct printing port,
wherein:
  the virtual direct printing port in the cooperation application receives the print job received from the mobile device using a Web service which the cooperation application provides; and
  the cooperation application:
    i) works on a specified platform,
    ii) when the print job is received from the mobile device, confirms whether or not the print buffer is full,
    iii) if the print buffer is not full, transmits the print job to the direct printing port, and
    iv) if the print buffer is full, notifies to the mobile device that the print buffer is full and advices the mobile device to sleep for a specific period via the virtual direct printing port.

* * * * *